United States Patent
Becker et al.

(10) Patent No.: US 9,931,710 B2
(45) Date of Patent: Apr. 3, 2018

(54) MOUNTING TOOL SYSTEM

(71) Applicant: EJOT GmbH & Co. KG, Bad Berleburg (DE)

(72) Inventors: Mirko Becker, Bad Laasphe (DE); Ingo Krausser, Bad Laasphe (DE); Herbert Born, Bad Berleburg (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 415 days.

(21) Appl. No.: 14/081,452

(22) Filed: Nov. 15, 2013

(65) Prior Publication Data
US 2014/0140779 A1    May 22, 2014

(30) Foreign Application Priority Data
Nov. 16, 2012 (DE) .................... 20 2012 011 021 U

(51) Int. Cl.
*B23K 20/12* (2006.01)
*B29C 37/04* (2006.01)
(Continued)

(52) U.S. Cl.
CPC .......... *B23K 20/1295* (2013.01); *B23B 51/04* (2013.01); *B23K 20/129* (2013.01); *B29C 37/04* (2013.01); *B29C 65/0672* (2013.01); *B29C 66/02245* (2013.01); *B29C 66/0326* (2013.01); *B29C 66/1122* (2013.01);
(Continued)

(58) Field of Classification Search
CPC . B23K 20/1295; B23C 37/04; Y10T 29/5147; Y10T 29/5168; Y10T 29/5182; B29C 37/04

USPC ........ 29/33 A, 50, 566; 228/2.1, 112.1, 113, 228/114; 156/73.5; 407/31, 34
See application file for complete search history.

(56) References Cited

U.S. PATENT DOCUMENTS 1,515,548 A     11/1924 Cerotsky
2,626,029 A  *  1/1953 Gutterman ............ F16D 43/211
                                                        192/31
(Continued)

FOREIGN PATENT DOCUMENTS

CH          378128 A     5/1964
CN      201187564 Y  *  1/2009
(Continued)

OTHER PUBLICATIONS

German Search Report dated Feb. 19, 2013.
European Search Report dated Mar. 6, 2014.
European Office Action dated Mar. 21, 2017.

*Primary Examiner* — Erica E Cadugan
*Assistant Examiner* — Michael Vitale
(74) *Attorney, Agent, or Firm* — Wood, Phillips, Katz, Clark & Mortimer

(57) ABSTRACT

A mounting tool (1) for mounting a friction-welding boss (9), wherein the mounting tool (1) includes a drive shaft (2) with a first end section (3) adapted to create a detachable force coupling with the friction-welding boss (9) or an adapter and a holder is arranged spring-loaded at the first end section (3) and at least one cutting means (6) is arranged at the holder (5). A milling adapter (10) includes a first end section (11) adapted to create a detachable force coupling with a mounting tool (1), and a second end section (12) including at least one cutting means (13).

9 Claims, 5 Drawing Sheets

(51) Int. Cl.
  *B29C 65/06* (2006.01)
  *B29C 65/00* (2006.01)
  *B23B 51/04* (2006.01)
(52) U.S. Cl.
  CPC .......... *B29C 66/474* (2013.01); *B29C 66/723* (2013.01); *B29C 66/73151* (2013.01); *B29C 66/8167* (2013.01); *B29C 66/8322* (2013.01); *B23B 2228/36* (2013.01); *B29C 66/727* (2013.01); *B29C 66/72525* (2013.01); *B29C 66/81264* (2013.01); *B29K 2995/007* (2013.01); *Y10T 29/5147* (2015.01); *Y10T 29/5168* (2015.01); *Y10T 29/5182* (2015.01); *Y10T 407/10* (2015.01)

(56) References Cited

U.S. PATENT DOCUMENTS

| | | | |
|---|---|---|---|
| 4,477,307 A | 10/1984 | Cearlock et al. | |
| 4,787,956 A | 11/1988 | Hoefer et al. | |
| 5,536,344 A | 7/1996 | van Dreumel | |
| 5,713,706 A * | 2/1998 | Lozano | B29C 65/0672 411/171 |
| 5,794,835 A * | 8/1998 | Colligan | B23C 5/22 228/13 |
| 6,153,035 A | 11/2000 | Van Laeken | |
| 7,954,404 B2 * | 6/2011 | Thielges | B21D 28/346 83/140 |
| 2002/0197120 A1 * | 12/2002 | Newmark | B23B 51/107 408/72 B |
| 2007/0172335 A1 * | 7/2007 | Christ | B23K 20/129 411/408 |
| 2010/0101909 A1 * | 4/2010 | Dell | F16F 15/1232 192/43 |
| 2010/0119772 A1 * | 5/2010 | Christ | B23K 20/12 428/138 |
| 2012/0128445 A1 * | 5/2012 | Hotte | F16B 17/006 411/82 |

FOREIGN PATENT DOCUMENTS

| | | | |
|---|---|---|---|
| DE | 10 2006 013 529 A1 | 10/2006 | |
| DE | 10 2009 038 697 A1 | 3/2011 | |
| GB | 765944 A * | 1/1957 | ............... B23C 5/26 |
| JP | S62 94026 U | 6/1987 | |
| JP | 02048107 A * | 2/1990 | ......... B23B 51/0426 |
| JP | 2001 087925 A1 | 4/2001 | |

* cited by examiner

MOUNTING TOOL SYSTEM

CROSS-REFERENCE TO RELATED APPLICATIONS

This application claims priority of German Application No. DE 20 2012 011 021.7, filed Nov. 16, 2012, entitled "Mounting Tool System". The full disclosure of this application is hereby incorporated by reference.

FEDERALLY SPONSORED RESEARCH OR DEVELOPMENT

Not Applicable.

MICROFICHE/COPYRIGHT REFERENCE

Not Applicable.

FIELD OF THE INVENTION

The invention regards a mounting tool system, in particular a mounting tool system for mounting friction-welding bosses into sandwich materials.

BACKGROUND OF THE INVENTION

Friction-welding bosses are fastening elements to fasten parts to foamed or honeycomb materials/sandwich materials, as for example used in the automobile industry, in the boat-building industry, campervan-building industry, or airplane-building industry. Thereby, the friction-weld bosses are commonly made out of a high dense plastic and are mounted into the material by pressure and friction. By means of the pressure and friction heat is created, such that parts of the material, into which the friction-welding boss is mounted, is melted and bonds with the friction-welding boss. The friction-welding boss in this respect represents an ideal base for securely fasten components to foamed materials or honeycomb materials/sandwich materials. Friction-welding bosses are preferably flush-mounted into the material.

However, when the friction-welding bosses are flush-mounted into the different materials, the problem arises that frequently molten material emerges to the surface of the material between the friction-welding boss and the edge of the material and a bulge is created around the mounting place of the friction-welding boss. This bulge has to be removed in a separate step, in order to create a unitary surface structure, such that a component can be flush-mounted to the friction-welding boss. Furthermore, according to the characteristics of the cover layer of the material, it may be necessary in a first step to remove the cover layer, such that in a subsequent step the friction-welding boss can be mounted into the material beneath. However, therefore further tools are necessary, as for example a face cutter. Also, further steps are necessary, on the one side to change the tools and on the other side to correctly align the tools.

SUMMARY OF THE INVENTION

The object of the present invention is to provide means for mounting at least one friction-welding boss into different materials, wherein the means allow to simplify the aforementioned steps and to render the step of finishing the surface of the material into which the friction-welding boss is mounted obsolete.

This object is solved by the apparatuses as claimed in the independent claims, the mounting tool, the milling adapter, and the mounting tool system, which comprises the mounting tool as well as the milling adapter.

The mounting tool according to the invention comprises a drive shaft, which comprises a first end section and a second end section. The first end section is adapted to create a force coupling with the friction-welding boss or an adapter, and the second end section is adapted to create a force coupling with a drive. For example, the second end section can be formed hexagonal—similar to a bit—, such that the mounting tool can be connected to a bit holder at the drive. The second end section can also have a round cross section, such that it is useable with a common drill chuck. However, also different other connections are possible, with which a detachable and non-detachable force coupling with a drive can be created. Furthermore, the mounting tool according to the invention comprises a holder, which is arranged at the first end section of the drive shaft. According to the invention, the holder is arranged spring-loaded at the first end section. Furthermore, according to the invention cutting means are arranged at the holder, wherein the cutting means is substantially aligned perpendicular to the rotational axis of the drive shaft. The at least one or the plurality of cutting means allow to remove the bulge created between the friction-welding boss and the material, when the friction-welding boss is mounted into the material. By ease of the spring-loaded bearing of the holder, it is furthermore achieved that the at least one cutting means does not also remove the surface of the material, but only the protruding bulge. Thereby, the spring-loaded bearing of the holder can be realized by a spring and a counter bearing arranged at the drive shaft. There are different possibilities, how the bulge can be removed or scraped off by ease of the spring-loaded bearing. For example, the spring can be designed in such a way as to not give way upon the first contact of the at least one cutting means with the bulge, but may give way when the cutting means contact the surface of the material, such that it is prevented that the at least one cutting means cuts into the material. Furthermore, the holder together with the spring can serve as depth stop. Therefore, the range of the spring can be limited and as soon as the spring is completely compressed or is compressed to a predetermined point, the rotation of the mounting tool is stopped.

Therefore, the mounting tool allows to remove a bulge created during mounting of a friction-welding boss between the friction-welding boss and the material, without that a further step and/or an additional tool would be required. Furthermore, the mounting tool according to the invention is easy to manufacture and requires very low maintenance.

However, for some material, it may become necessary to remove a defined area of a cover layer of the material in which the friction-welding boss is going to be mounted. This removal of the cover layer is provided by the milling adapter according to the invention.

The milling adapter according to the invention comprises a first end section which is adapted to create a detachable force coupling with the mounting tool as well as a second end section which at least comprises one cutting means. By ease of the milling adapter according to the invention, a defined area of a cover layer of the material can be removed, by the cutting means. This is in particular helpful, when the cover layer of the material has a rigidity in which the friction-welding boss cannot be mounted, without at first removing a defined area of the cover layer. For this task, the cutting means can be differently designed and can be adapted to the cover layer material, which has to be removed. For example, the cutting means can comprise one or a plurality of hardened cutting edges, which can either be continuous, or discontinuous. Furthermore, the at least one cutting means can also be exchangeable, such that with one milling adapter different cover layers can be removed.

By having the first end section designed to create a detachable force coupling with the mounting tool, there are no further tools necessary besides the milling adapter, in order to remove the cover layer. Hence, the milling adapter presents a very simple and fast way of removing the cover layer.

If the mounting tool according to the invention and the milling adapter according to the invention are connected, then they form the mounting tool system according to the invention. By ease of this mounting tool system at first a defined area of a cover layer of a material by ease of the milling adapter can be removed, before subsequently a friction-welding boss can be mounted into the material, whereby at the same time the bulge created by the mounting of the friction-welding boss can be removed. Hence, the mounting tool system according to the invention reduces the steps necessary to mount a friction-welding boss into a material. Also the removal of the cover layer before the mounting of the friction-welding boss is now possible by using only a few steps, most notably with the mounting tool according to the invention no further adjustment of the mounting tool after the removal of the cover layer is necessary.

In the following preferred embodiment examples of the mounting tool according to the invention and the milling adapter according to the invention are described. Thereby, the described embodiment examples have to be understood to be equivalent to each other and not one more preferred as the other. Furthermore, according to the intention features of different embodiment examples can freely be combined.

In one preferred embodiment example, the at least one cutting means of the mounting tool is an indexable insert. The indexable insert is used for removing the bulge created between the material and the friction-welding boss by mounting the same. Therefore, the indexable insert may have one hardened continuous or discontinuous cutting edge. The position of the at least one cutting means at the holder can be variable, such that the mounting tool can be adapted to different sizes of friction-welding bosses. Thereby, either the position of the at least one cutting means at the holder can be varied, or the at least one cutting means can be placed at a fixed position at the holder, but the size of the holder or its extend is variable or adjustable, respectively, such that indirectly the position of the cutting means is variable or adjustable, respectively. Also the number of cutting means is variable and can be chosen in correspondence with the characteristics of the bulge, which is created when the friction-welding boss is mounted. In this case, the holder can comprise several holders for the cutting means.

In a further preferred embodiment example, the first end section of the mounting tool comprises at least one protruding element, which can be arranged in a recess of the friction-welding boss in order to provide a detachable force coupling. Thereby, the number and design of the at least one protruding element is preferably chosen as such to provide a sufficient torque transmission from the drive shaft of the mounting tool to the friction-welding boss, and in order to press and weld it into the material. Furthermore, the design of the at least one protruding element should be as such that the friction-welding boss is hold at the first end section of the mounting tool and is not unintentional detached from it. Therefore, the at least one protruding element can for example be designed as such that it click connects with the friction-welding boss. For example, the at least one protruding element can be trapezoidal, with the tapered edge pointing to the drive shaft, such that the friction-welding boss, which at least comprises a corresponding recess, can be attached to the protruding element only by using some amount of force. Such arrangements or other of the similar sort prevent that the friction-welding boss is unintentionally detached from the first end section of the mounting tool. The at least one protruding element can also be used to create force couplings with corresponding adapters, as for example the milling adapter. Thereby, the at least one protruding element can grip into corresponding recesses in the adapter. In order to be compatible with a wide variety of friction-welding bosses and/or adapters, the at least one protruding element can be exchangeable, or the distance between several protruding elements with respect to each other can be adjustable. For example, the protruding element/elements can be arranged at the first end section of the mounting tool on secure click-on connection rails, which allow to fixate the protruding elements at different positions. However, also other solutions are encompassed to connect different protruding elements to the mounting tool as known to a person skilled in the art.

In another preferred embodiment example, the first end section of the mounting tool comprises a centering tip, in order to center the friction-welding boss with respect to the first end section and/or the material. Since the friction welding is performed by a rotational motion of the friction-welding boss, a precise centering of the friction-welding boss is imperative, in order to achieve the best possible welding. For example, if due to a not precise centering of the friction-welding boss, an unbalance is created, it can happen that not all sides of the friction-welding boss are equally welded to the material. The at least one centering tip is preferably designed such that it extends through the friction-welding boss, such that when the friction-welding boss is mounted, it first contacts the material, before the friction-welding boss, such that it creates a centering opening. The at least one centering tip can for example additionally comprise means, which hold the friction-welding boss, when the friction-welding boss is attached to the mounting tool.

In a further preferred embodiment example, the mounting tool comprises a clutch, wherein the clutch is adapted to de-couple the rotational motion of the drive shaft from the rotational motion of the holder. This can for example be advantageous, when the rotational motion of the drive shaft has already stopped, because the friction-welding boss is mounted in the correct depth in the material, but for the thoroughly removal of the created bulge a few further rotations of the holder with the cutting means would be necessary. The clutch can for example cause the holder to overspin, when the rotational motion of the drive shaft has already stopped, or the clutch can de-couple the drive shaft from the drive, such that the holder is only rotated by the drive, but not the drive shaft.

In a further embodiment example, the holder and/or the first end section of the mounting tool are made out of metal. This is for example advantageous, when the milling adapter—or any other adapter—shall be connected to the mounting tool, because then this connection can be achieved magnetically or at least can be magnetically supported. By ease of such a magnetic connection, the adapter can only be detached from the holder and/or the first end section of the mounting tool by using some amount of force. Alternatively or additionally the holder and/or the first end section of the mounting tool can also comprise at least one magnetic element, which can create a magnetic connection with the adapter. However, also other connections between the mounting tool and the adapters are contemplated, for example click connections.

In a further preferred embodiment, the at least one cutting means of the milling adapter can also be an indexable insert, which can be exchanged dependent upon the material of the cover layer to be removed. The at least one cutting means can comprise at least one hardened cutting edge, which either can be continuous, or discontinuous. The milling edge can be made as one piece with the at least one cutting means. In order to mil a defined area of a cover layer, the at least one cutting means can extend over half of the total width of the abutting face of the second end section of the milling adapter.

In a further preferred embodiment example, the first end section of the milling adapter comprises a magnetic element, in order to be magnetically connected to the mounting tool, such that the milling adapter can only be detached from the mounting tool by using an amount of force.

In a further preferred embodiment example, the milling adapter is made out of metal. This not only allows a certain amount of stability, but also allows to connect the milling adapter magnetically to the mounting tool, when the mounting tool comprises a magnetic element. Alternatively, the milling adapter comprises at the first end section a metal, which can be contacted by a magnetic element of the mounting tool.

Further details, features, and advantages of the invention become apparent from the dependent claims, as well as from the following description of the figures in which—exemplarily—a preferred embodiment example of the invention is depicted.

Other objects, features, and advantages of the invention will become apparent from a review of the entire specification, including the appended claims and drawings.

DETAILED DESCRIPTION OF THE PREFERRED EMBODIMENT

Figures 1, 2:
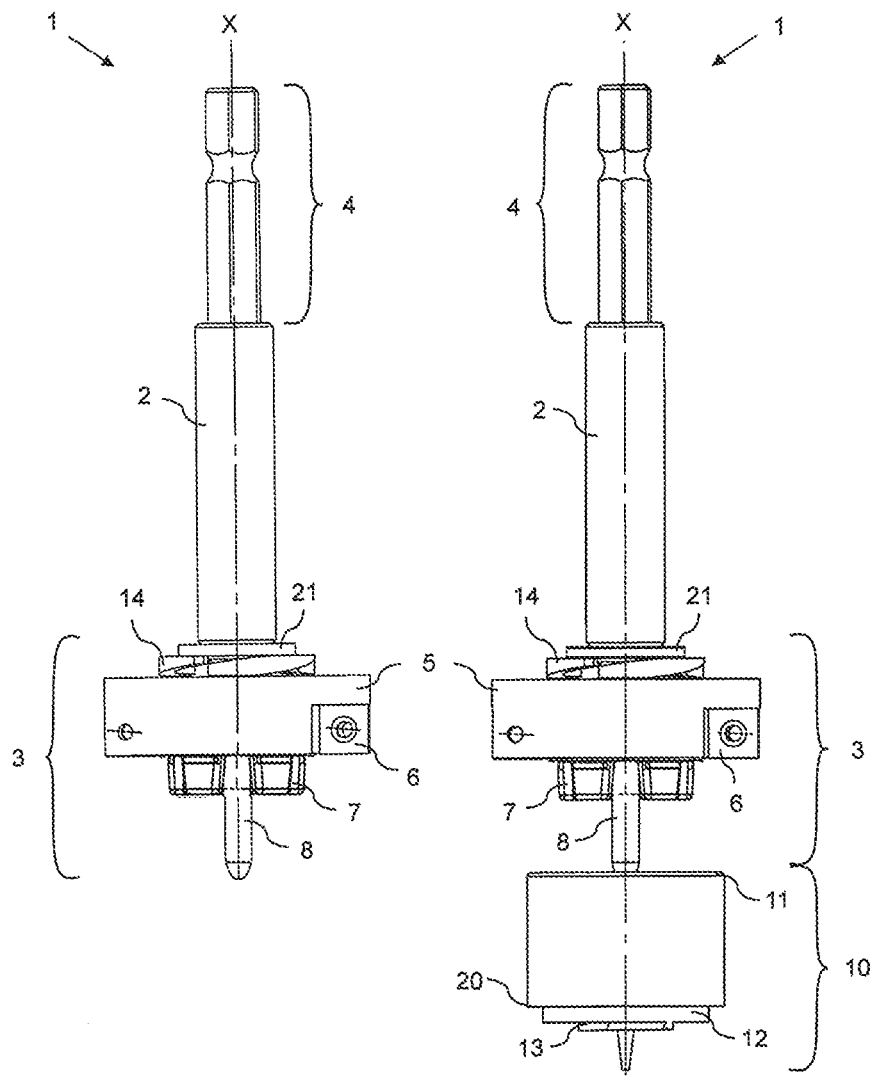
FIG. 1 a perspective view of an exemplary embodiment of the mounting tool according to the invention.
FIG. 2 a perspective view of an exemplary embodiment of the mounting tool according to the invention and the milling adapter according to the invention.

FIG. 1 shows an exemplary embodiment of the mounting tool 1 according to the invention. The mounting tool 1 comprises a drive shaft 2. The drive shaft 2 comprises a first end section 3, and a second end section 4. Both end sections are arranged at opposing sides of the drive shaft 2. The mounting tool 1 according to the embodiment shown in FIG. 1 exhibits at the second end section 4 a hexagonal form, similar to known bit tools and can thereby create a detachable force coupling with the drive. However, also other connections between the second end section 4 and the drive are contemplated. For example, the second end section 4 can have a round cross section, such that it can be connected to a common drill chuck. Thereby, the connection can be detachable as well as non-detachable. For example a non-detachable connection between the second end section 4 and the drive can exist. The mounting tool 1 can also be part of the drive itself.

The first end section 3 of the drive shaft of the mounting tool 1 comprises according to the embodiment shown in FIG. 1 a circular shaped holder 5. Thereby, the drive shaft 2 extends through the central opening of the circular shaped holder 5 and the first end section 3 tapers into a centering tip 8. Around the centering tip 8 protruding elements 7 are arranged in FIG. 1, which can be arranged into the corresponding recesses in the friction-welding boss 9 (see FIG. 4), in order to create a detachable force coupling. Also the centering tip 8 of the drive shaft 2 can grip into a centric recess of the friction-welding boss 9 (see FIG. 4), such that it can be centered at the mounting tool 1. Furthermore, the centering tip 8 provides that the friction-welding boss 9 (see FIG. 4) is center mounted into the material, such that no unbalance occurs and all sides of the friction-welding boss 9 (see FIG. 4) are welded equally to the material. The specific design of the protruding elements 7 is arbitrary and only dependent upon the torque, which shall be transferred from the mounting tool 1 to the friction-welding boss 9 (see FIG. 4). The same is also valid for the number of the protruding elements 7. In order to render the mounting tool 1 compliant with a large number of different friction-welding bosses 9 (see FIG. 4), which for example comprise a different geometry or placing of their recesses, the protruding elements 7 can also be exchangeable, or the distance of the protruding elements 7 to each other can be varied. Also, it is contemplated that the protruding elements 7 comprise further means, which can not only grip into the recesses in the friction-welding boss 9 (see FIG. 4), but which also can create a further force coupling, in order to better transfer torque to the friction-welding boss 9 (see FIG. 4) without the risk that the protruding elements 7 detach from the recesses. For example, click connections or under- or over-cuttings of elements can be chosen, in order to better transfer the torque. These further means can also be used to hold the friction-welding boss 9 (see FIG. 4) at the mounting tool 1, before the friction-welding boss 9 (see FIG. 4) which is going to be mounted contacts the material in which it is going to be mounted.

In the embodiment as shown in FIG. 1, the circular holder 5 is arranged at the first end section 3 of the drive shaft 2. The circular holder 5 is spring-loaded arranged at the drive shaft 2, by ease of the spring 14. The spring 14 is thereby arranged between a counter bearing 21 at the drive shaft 2 and the holder 5. The spring-loaded holder 5 supports the removal of a bulge. When the cutting means 6, which is arranged at the holder 5, contacts the bulge 18 (see FIG. 5), which is created when the friction-welding boss 9 (see FIG. 4) is mounted, then the cutting means 6 removes the bulge 18 (see FIG. 5). However, as soon as the resistance increases, hence when the cutting means 6 not only contact the bulge 18 (see FIG. 5), but also the surface of the material in which the friction-welding boss 9 (see FIG. 4) is going to be mounted, then the spring-loaded holder 5 can spring back, such that not also material of the surface is removed.

However, also other spring-loaded bearings the holder 5 are contemplated. For example, the holder 5 can also be spring-loaded by ease of an adaptive spring, such that the reset force of the spring can be adapted to the material. For example, for dense materials a higher reset force can be provided as for soft materials. Furthermore, the spring 14 can also be exchangeable, such that the spring 14 can be changed, when the friction-welding bosses 9 have to be mounted in different materials. Also, the counter bearing 21 at the drive shaft 2 can be variable and adjustable, respectively, such that thereby the force exerted upon the holder 5 by means of the spring 14 can be adjusted.

Figure 4:
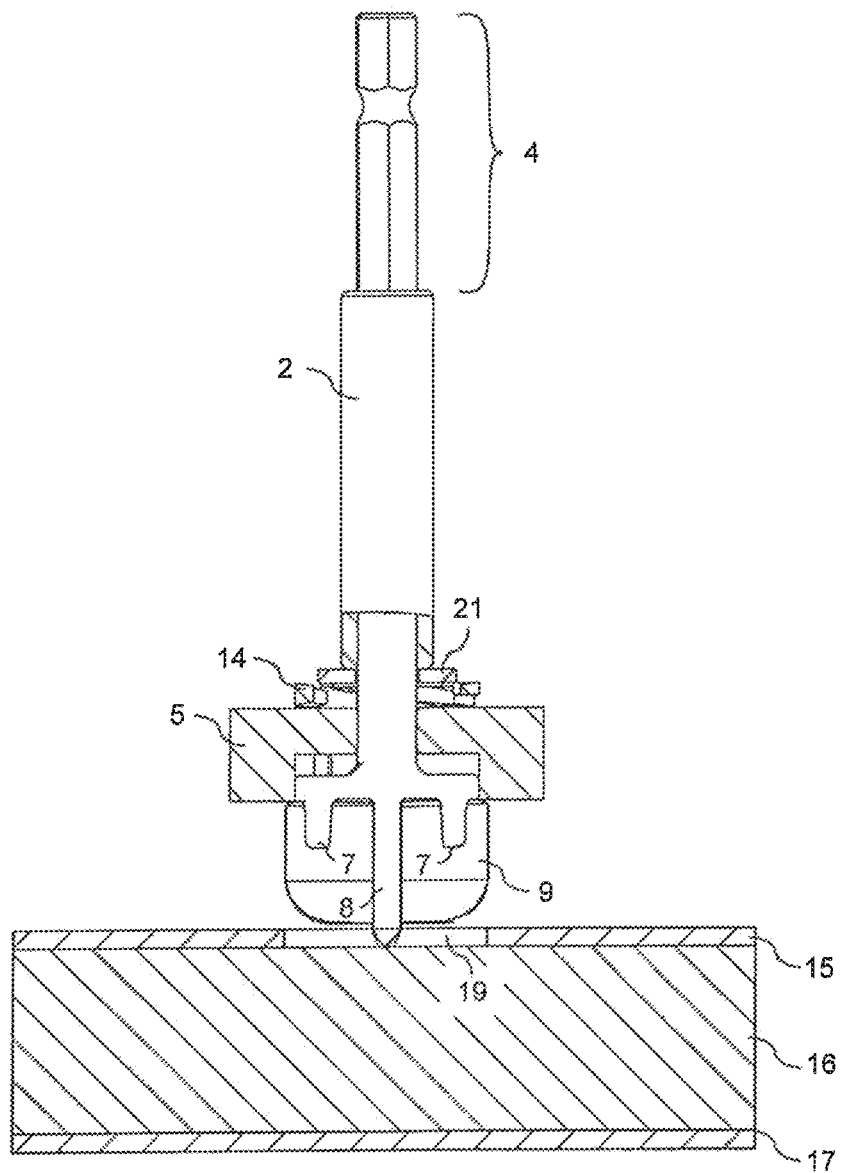
FIG. 4 a cross section view of an exemplary embodiment of the mounting tool according to the invention with a friction-welding boss right before the mounting of the friction-welding boss.
Figure 5:
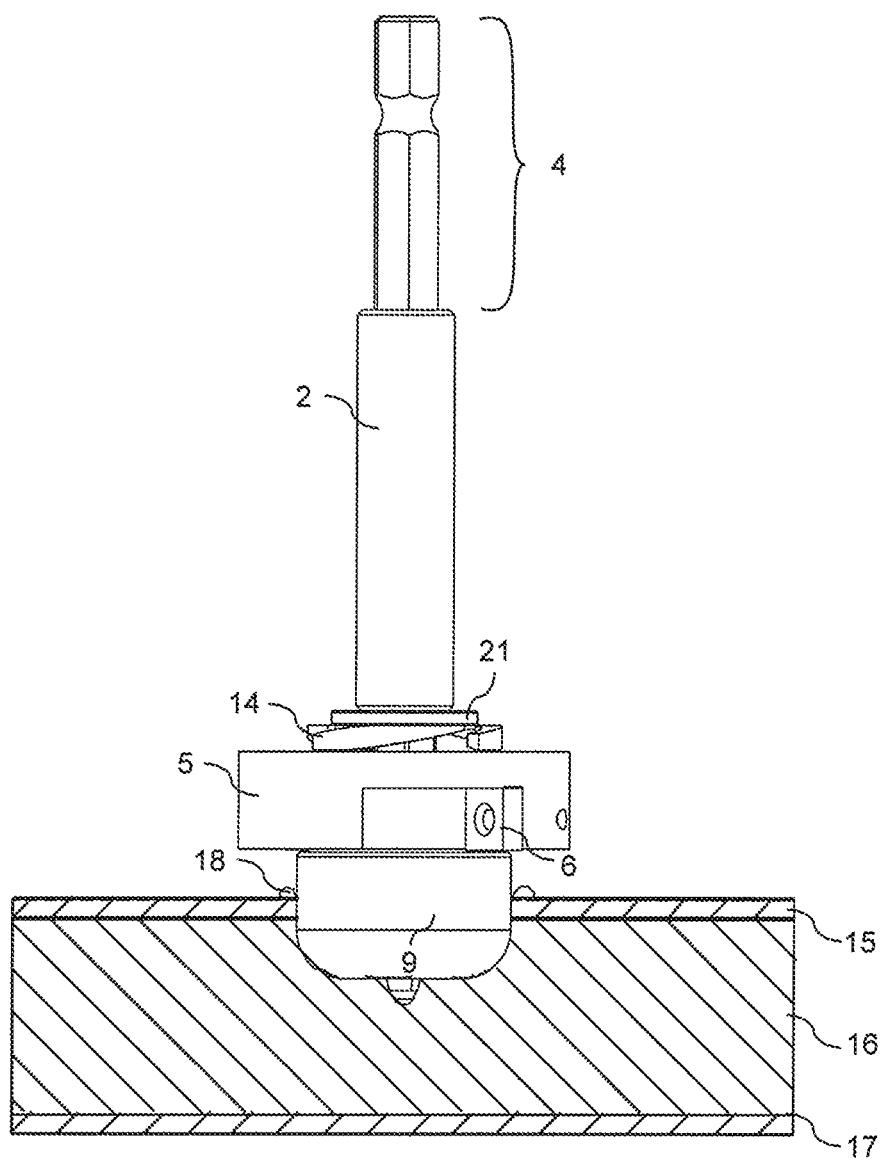
FIG. 5 a perspective view of an exemplary embodiment of the mounting tool during mounting of a friction-welding boss into the sandwich material.

The cutting means 6 as shown in the embodiment of FIG. 5 is an indexable insert. Thereby, the cutting edge of the indexable insert is substantially perpendicular to the rotational axis X of the mounting tool 1, such that the cutting edge can remove the created bulge 18 (see FIG. 5). However, also other cutting means are contemplated, which are suitable to remove the bulge 18 (see FIG. 5), which is created when the friction-welding boss 9 (see FIG. 4) is mounted. Also the number of cutting means 6 is not limited to the one cutting means 6, as shown in FIG. 1. Also, an arbitrary number of cutting means 6 can be used. Thereby, the position of the cutting means 6, for example, for different sizes of friction-welding bosses 9 (see FIG. 4) can be varied and adjusted. For example, a cutting means 6 can have a variable position at the holder 5, such that the cutting means 6 can be adjusted, for example, along a predefined path. Hence, with only one mounting tool 1, various friction-welding bosses 9 (see FIG. 4) can be mounted, without the need to use a further mounting tool 1 every time. Furthermore, it is also contemplated that the cutting edge of the cutting means 6, which in the embodiment as shown in FIG. 1 extends from the protruding elements 7 to the edge of the holder 5, extends only on a particular length, which is necessary to remove the bulge 18 (see FIG. 5), which is created when the friction-welding boss 9 (see FIG. 4) is mounted.

Figure 6:
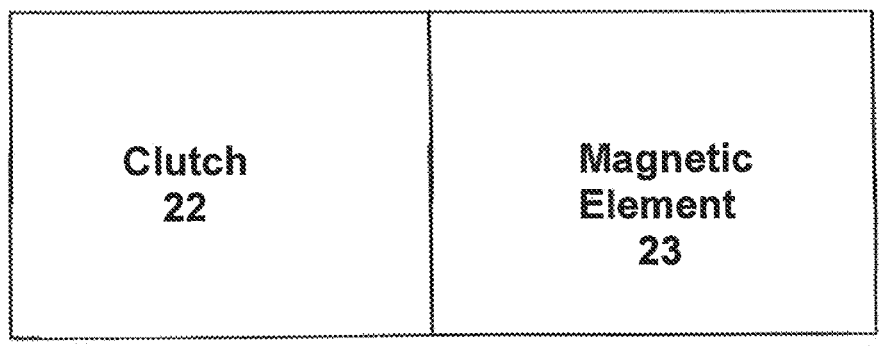
FIG. 6 is a figure in the form of text boxes showing that the mounting tool can further include a clutch and/or a magnetic element.

FIG. 2 shows an exemplary embodiment of the mounting tool 1, as shown in FIG. 1, together with an exemplary embodiment of the milling adapter 10 according to the invention. The milling adapter 10 comprises a first end section 11, which is adapted to create a detachable force coupling with the mounting tool 1. Thereby, for example, the protruding elements 7 of the mounting tool 1 can grip into recesses—not shown here—of the milling adapter 10, such that torque can be transferred from the mounting tool 1 to the milling adapter 10. However, also other couplings between the milling adapter 10 and the mounting tool 1 are contemplated. In order that the milling adapter 10 can better hold the mounting tool 1 the mounting tool 1 and/or the milling adapter 10 can comprise magnetic elements, which are chosen as such that they attract each other. Thereby, the magnetic element can be passive or active. Furthermore, it is also possible that only the mounting tool 1 comprises a magnetic element 23 as depicted diagrammatically in FIG. 6 and the milling adapter 10 is made out of metal or the mounting tool 1 is made out of metal and the milling adapter 10 comprises a magnetic element. Such a magnetic connection can be advantageous, when the protruding elements 7 of the mounting tool 1 are not formed as such to hold the milling adapter 10.

The second end section 12 of the milling adapter 10 is designed to be able to remove the cover layer 15 (see FIG. 3) of a material into which the friction-welding boss 9 (see FIG. 4) is going to be mounted. Therefore, the second end section 12 of the milling adapter 10 comprises at least one cutting means 13. This at least one cutting means 13 can for example cut along the circumference of a defined area, such that later on the area defined by the circumferential cutting line can be removed or taken off, respectively. Alternatively, the cutting means 13 can be adapted to directly remove the defined area of the cover layer 15 (see FIG. 3) of the material, for example, by ease of milling or scraping. Therefore, the milling adapter 10 preferably comprises a cutting means 13, which extends substantially over the complete width of the abutting face of the second end section 12 of the milling adapter 10. However, also various different cutting means 13 are contemplated, which are able to remove a defined area of a cover layer 15 (see FIG. 3) of a material. The second end section 12 of the milling adapter 10 can also comprise a bearing 20, which prevents the milling adapter 10 to penetrate deeper into the material as defined by the bearing 20. Also, the milling adapter 10 can comprise at the second end section 12 a centering tip, which allows that the milling adapter 10 can penetrate the material centrally.

Figure 3:
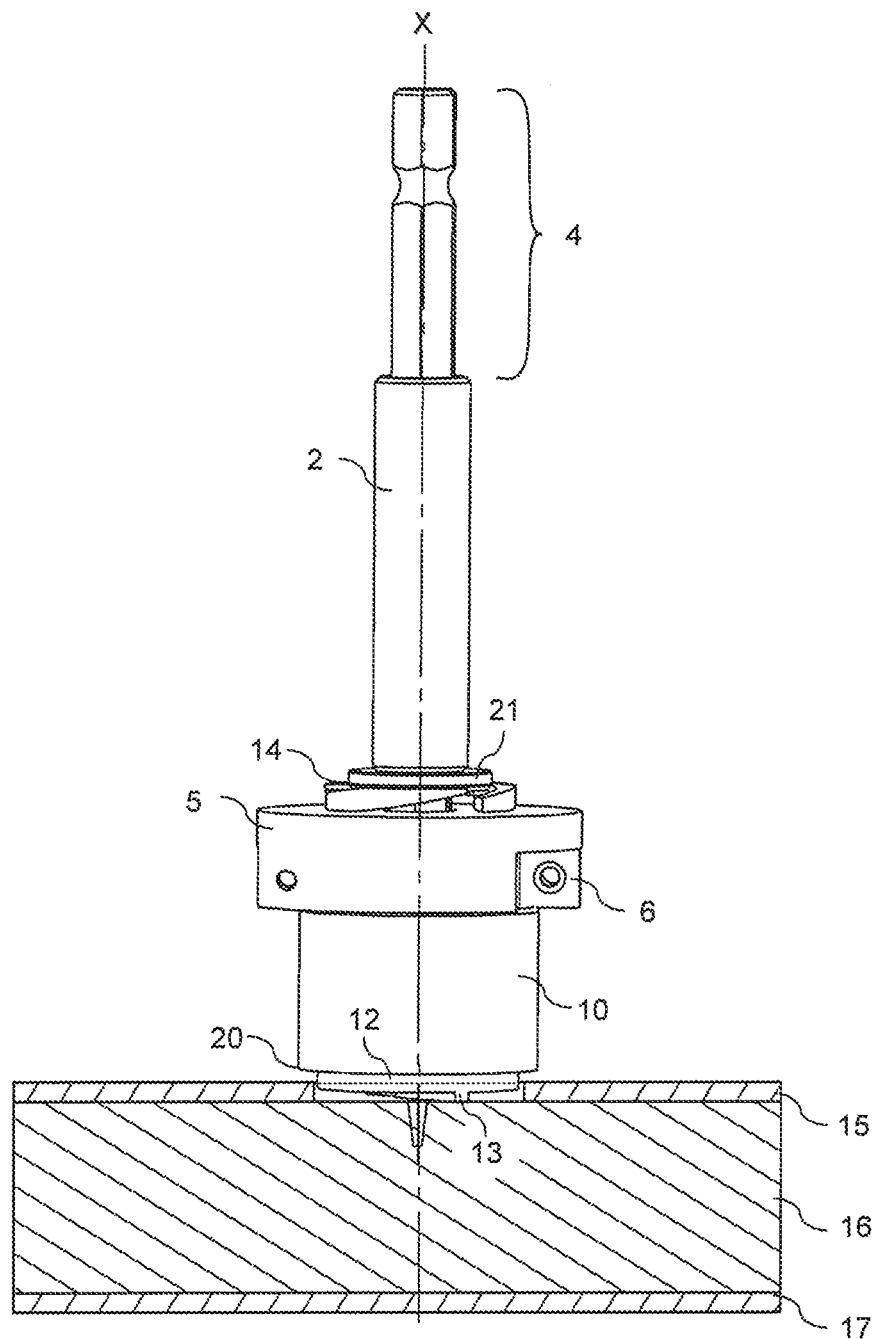
FIG. 3 a perspective view of an exemplary embodiment of the mounting tool according to the invention and the milling adapter according to the invention during removal of a defined area of a sandwich material.

FIG. 3 shows a view of an exemplary embodiment of the mounting tool system according to the invention with mounting tool 1 and milling adapter 10 during the removal of a defined area of a cover layer 15 of a sandwich material. In the here shown example, the material comprises a top cover layer 15, an inner material 16, and a lower cover layer 17. In the shown embodiment the milling adapter 10 is arranged at the mounting tool 1, such that the rotational motion of the mounting tool 1 can be transferred to the milling adapter 10. By ease of the rotational motion of the milling adapter 10, the cover layer 15 is removed in a defined area, by ease of the cutting means 13, which are arranged at the second end section 12 of the milling adapter 10. The cutting means 13 therefore has a suitable cutting edge, which exhibits a sufficient hardness, in order to remove the cover layer 15. For example, the cutting means 13 can also be exchangeable in order to be adaptable to different cover layers 15. Therefore, the cutting means 13 can for example be connected to the second end section 12 of the milling adapter 10, by ease of a click connection. Alternatively, the cutting means 13 can also be connected to the second end section 12 of the milling adapter 10, by ease of a screw connection. In general, the complete second end section 12 of the milling adapter 10 can be exchangeable, such that it can be adapted to different sizes of friction-welding bosses 9 (see FIG. 4).

FIG. 4 shows a cross section view of the exemplary embodiment of the mounting tool 1 of the mounting tool system according to the invention, with a friction-welding boss 9 arranged at the first end section 3, before the friction-welding boss 9 is mounted into the sandwich material. Also in this example, the material consist of a top cover layer 15, an inner material 16, and a lower cover layer 17. In the embodiment as shown in FIG. 4, the centering tip 8 of the first end section 3 of the mounting tool 1 extends through the friction-welding boss 9 in order to center it. The centering tip 8 can for example extend into an opening, which is formed by the centering tip of the milling adapter. Furthermore, the protruding elements 7 of the first end section 3 of the mounting tool 1 extend into the friction-welding boss 9. By ease of the protruding elements 7 a detachable force coupling between the mounting tool 1 and the friction-welding boss 9 is created, such that the torque which is transferred from the drive to the drive shaft 2, can be transferred to the friction-welding boss 9, in order to mount the friction-welding boss 9 into the sandwich material. Thereby, a defined area 19 of the cover layer 15 has already been removed in a first step, by ease of the milling adapter 10, as shown in FIG. 3.

FIG. 5 shows an exemplary embodiment of a mounting tool 1 according to the invention, with a friction-welding boss 9 arranged at the first end section 3 during the mounting of the friction-welding boss 9 into a sandwich material. Thereby, during the mounting of the friction-welding boss 9 already a bulge 18 has been formed between the friction-welding boss 9 and the material. When the friction-welding boss 9 is advanced into the material, the holder 5 and therefore also the cutting means 6 come closer to the bulge 18, until the cutting means 6 contacts the bulge 18 and is able to scrape it off, such that no further processing of the cover layer 15 is necessary. Once the friction-welding boss 9 is flush-mounted, the cutting means 6 will have removed the bulge 18 completely. However, it can during the mounting process be necessary, that after the advancing, the holder 5 has to perform an overspin in order to completely remove the bulge 18. In order to allow this to happen, there can be a clutch 22 as depicted diagrammatically in FIG. 6 arranged between the holder 5 and the drive shaft 2, which de-couples the rotational motion of the holder 5 and the drive shaft 2 and allows an overspin of the holder 5.

The invention claimed is:

1. A mounting tool for mounting a friction-welding boss, wherein the mounting tool comprises:
a drive shaft with
a first end section, wherein the first end section is adapted to create a detachable force coupling with the friction-welding boss or an adapter, and
a second end section, wherein the second end section is adapted to create a force coupling with a drive; and
a holder arranged at the first end section of the drive shaft, characterized in that
the mounting tool further comprises a bearing and a spring carried on the first end section, wherein the spring is arranged between the bearing and the holder such that the holder is spring-loaded to translate relative to the first end section; and
at least one cutting means is carried in the holder for translation relative to the first end section.

2. The mounting tool according to claim 1, wherein the at least one cutting means is an indexable insert.

3. The mounting tool according to claim 1, wherein the first end section comprises at least one protruding element for creating a detachable force coupling with the friction-welding boss.

4. The mounting tool according to claim 1, wherein the first end section comprises at least one centering tip.

5. The mounting tool according to claim 1, wherein the mounting tool further comprises a clutch, wherein the clutch is adapted to de-couple the rotational motion of the drive shaft and the holder.

6. The mounting tool according to claim 1, wherein the holder and/or the first end section is made out of metal.

7. The mounting tool according to claim 1, wherein the holder and/or the first end section comprises a magnetic element.

8. A mounting tool system, comprising:
a mounting tool, wherein the mounting tool comprises:
a drive shaft with
a first end section, wherein the first end section is adapted to create a detachable force coupling with a friction-welding boss or an adapter, and
a second end section, wherein the second end section is adapted to create a force coupling with a drive and
a bearing and a spring carried on the first end section, wherein the spring is arranged between the bearing and a holder such that the holder is spring-loaded to translate relative to the first end section and at least one cutting means is carried in the holder for translation relative to the first end section; and
the adapter in the form of a milling adapter, wherein the milling adapter comprises:
a first end section, wherein the first end section is adapted to create a detachable force coupling with the mounting tool;
a second end section, wherein the second end section comprises at least one cutting means;
wherein the milling adapter is arranged detachable at the first end section of the mounting tool.

9. The mounting tool system according to claim 8, wherein the milling adapter is adapted to be magnetically connected to the first end section of the mounting tool.

\* \* \* \* \*